US007275798B2

(12) United States Patent
Im

(10) Patent No.: US 7,275,798 B2
(45) Date of Patent: Oct. 2, 2007

(54) METHOD AND APPARATUS FOR CORRECTING DEVIATION OF TEMPERATURE SENSOR

(75) Inventor: Dae-hyeok Im, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 200 days.

(21) Appl. No.: 10/879,075

(22) Filed: Jun. 30, 2004

(65) Prior Publication Data

US 2005/0093910 A1 May 5, 2005

(30) Foreign Application Priority Data

Oct. 29, 2003 (KR) ...................... 10-2003-0075816

(51) Int. Cl.
*B41J 29/393* (2006.01)
*B41J 29/38* (2006.01)
*G01K 15/00* (2006.01)

(52) U.S. Cl. .............................. 347/19; 347/17; 374/1

(58) Field of Classification Search ................... 347/19
See application file for complete search history.

(56) References Cited

U.S. PATENT DOCUMENTS 5,485,182 A * 1/1996 Takayanagi et al. .......... 347/17
5,751,304 A * 5/1998 Hirabayashi et al. ......... 347/17
5,760,797 A * 6/1998 Koizumi et al. .............. 347/14
6,086,180 A * 7/2000 Sugimoto et al. ............. 347/14
6,109,718 A * 8/2000 Murakami et al. ............ 347/14
6,213,579 B1 * 4/2001 Cornell et al. ................ 347/14
6,356,774 B1 * 3/2002 Bernstein et al. ........... 600/323
6,464,318 B2 * 10/2002 Kubo .......................... 347/17
6,631,969 B2 * 10/2003 Nagoshi et al. ............... 347/19
6,705,694 B1 * 3/2004 Barbour et al. ................ 347/9
6,719,395 B2 * 4/2004 Iwasaki et al. ............... 347/19

FOREIGN PATENT DOCUMENTS

| | | |
|---|---|---|
| JP | 59-20682 | 2/1984 |
| JP | 4-152151 | 5/1992 |
| JP | 9-174892 | 7/1997 |
| JP | 10-151787 | 6/1998 |
| JP | 2002-086782 | 3/2002 |

* cited by examiner

*Primary Examiner*—Matthew Luu
*Assistant Examiner*—Shelby Fidler
(74) *Attorney, Agent, or Firm*—Roylance, Abrams, Berdo & Goodman, LLP

(57) ABSTRACT

A method and apparatus for correcting deviation of a temperature sensor placed in a header having a plurality of nozzles in an inkjet printer is provided. The deviation correcting method includes spraying ink through the nozzles a predetermined number of times, measuring a temperature of the temperature sensor corresponding to the number of sprayed times, measuring a voltage output from the temperature sensor, and determining a correction value of the temperature sensor using the measured temperature and the output voltage. According to the method and apparatus, it is possible to correct a large amount of deviation of a thermistor in a header without using an additional element, that is, an ambient sensor. Therefore, since an expensive ambient sensor is not used, costs can be reduced and a printer circuit configuration is simplified.

14 Claims, 3 Drawing Sheets

| SPRAYED TIMES | MEASURED TEMPERATURE(℃) | TEMPERATURE SENSOR VOLTAGE(V) | | |
|---|---|---|---|---|
| | | TEMPERATURE SENSOR "A" | TEMPERATURE SENSOR "B" | TEMPERATURE SENSOR "C" |
| | 20 | 1.0 | 1.2 | 1.4 |
| 100TIMES | 40 | 1.2 | 1.4 | 1.6 |
| 200TIMES | 60 | 1.4 | 1.6 | 1.8 |
| 300TIMES | 80 | 1.6 | 1.8 | 2.0 |

METHOD AND APPARATUS FOR CORRECTING DEVIATION OF TEMPERATURE SENSOR

PRIORITY

This application claims the benefit under 35 U.S.C. §119 (a) of Korean Patent Application No. 2003-75816, filed on Oct. 29, 2003, in the Korean Intellectual Property Office, the entire disclosure of which is incorporated herein by reference.

BACKGROUND OF THE INVENTION

1. Field of the Invention

The present invention relates to an inkjet printer. More particularly, the present invention relates to a method and apparatus for correcting deviation of a temperature sensor placed in a header having a plurality of nozzles in an inkjet printer.

2. Description of the Related Art

Inkjet printers spray ink through a plurality of nozzles placed in a header by driving heaters placed in the header. Although the same driving pulse signal is applied to the header, a different amount of ink is sprayed based on a substrate temperature of the header. Since a print quality is affected by the substrate temperature of the header, there is a need for a printer to correctly detect a temperature in order to apply a driving pulse signal suitable for the temperature. For example, when it is low in temperature, the substrate is heated to increase the temperature. Conversely, when it is high in temperature, the driving pulse signal is decreased or the printer waits until the temperature falls.

Generally, a thermistor is used as a temperature sensor for sensing the temperature of the inkjet printer header. The thermistor is a thermally sensitive resistor whose resistance is changed sensitively according to change of a temperature. A voltage output from the thermistor is amplified in order to measure the temperature of the header. Then, the amplified analog output voltage is converted into a digital form. The temperature of the thermistor, that is, the temperature of the header can be measured based on the digitized output voltage. Normally, there is large deviation of ±20% in the thermistor. Thus, there is a need to correct the deviation of the thermistor for more accurate temperature readings.

For example, U.S. Pat. No. 6,628,906, entitled "Image forming apparatus with temperature based control" discloses an image forming apparatus for sensing a temperature using such a thermistor.

As described above, it is needed to correct the deviation of the thermistor in the printer. In order to correct the deviation, a relatively high-priced ambient sensor, which is a sensor for sensing an ambient temperature, is placed in an engine board which is a main board of the printer. In order to correct the deviation of the thermistor in the printer having the ambient sensor, the voltage of the thermistor in the header is firstly measured. The output voltage from the thermistor corresponding to a current temperature is found by reading the accurate ambient sensor with respect to the measured voltage. Therefore, since the deviation of each thermistor is measured, the measured temperature of the thermistor can be corrected.

As described above, an IC (Integrated Circuit) type ambient sensor is additionally used in the engine board, in order to correct the deviation of the thermistor for sensing the temperature of the header in the conventional inkjet printer. However, there is a drawback that such an ambient sensor is expensive, even though it is accurate. Another drawback is that the printer circuit configuration is complicated.

SUMMARY OF THE INVENTION

Embodiments of the present invention provide a method of correcting deviation of a temperature sensor in a header placed in an inkjet printer without using an ambient sensor, as well as an apparatus for correcting deviation of a temperature sensor in a header placed in an inkjet printer without using an ambient sensor.

According to an aspect of the present invention, there is provided a method of correcting deviation of a temperature sensor placed in a header having a plurality of nozzles in an inkjet printer. The method includes spraying ink through the nozzles a predetermined number of times; determining a temperature of the temperature sensor corresponding to the number of sprayed times; measuring a voltage output from the temperature sensor; and determining a correction value of the temperature sensor using the measured temperature and the output voltage of the temperature sensor.

Preferably, the temperature sensor deviation correcting method further includes storing the correction value in a nonvolatile memory.

According to another aspect of the present invention, there is provided an apparatus for correcting deviation of a temperature sensor placed in a header having a plurality of nozzles in an inkjet printer. The apparatus comprises a header for spraying ink through the nozzles a predetermined number of times. The apparatus also includes a unit for determining a temperature of the temperature sensor corresponding to the number of sprayed times; a unit for measuring a voltage output from the temperature sensor; and a controller for determining a correction value of the temperature sensor using the temperature and the output voltage of the temperature sensor.

Preferably, the temperature sensor deviation correcting apparatus further includes a nonvolatile memory for storing the correction value therein.

BRIEF DESCRIPTION OF THE DRAWINGS

The above and other features and advantages of the present invention will become more apparent by describing in detail exemplary embodiments thereof with reference to the attached drawings in which.

Throughout the drawings, it should be understood that like reference numerals are used to designate like features and structures.

DETAILED DESCRIPTION OF EXEMPLARY EMBODIMENTS

Hereinafter, an embodiment of the present invention will be described in detail with reference to the attached drawings. Unnecessary detail will be omitted to avoid obscuring the invention. Terms used hereinafter are used considering the functions in the present invention and may be changed according to a user's or operator's intension or usual practice. Accordingly, the terms will be defined based on the entire content of the description of the present invention.

Figure 1:
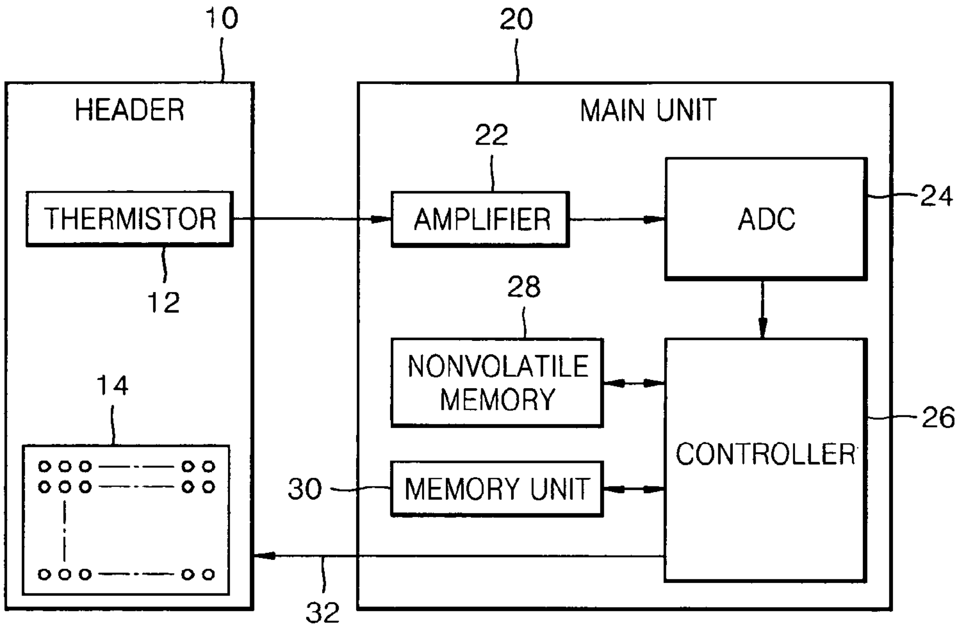
FIG. 1 is a block diagram of a temperature sensor deviation correcting apparatus according to an embodiment of the present invention.

FIG. 1 is a block diagram of a temperature sensor deviation correcting apparatus according to an embodiment of the present invention.

The temperature sensor deviation correcting apparatus includes a header 10 and a main unit 20. The header 10 includes a thermistor 12 as a temperature sensor and a plurality of nozzles 14. The thermistor 12 transmits an output voltage of the thermistor to the main unit 20 in order to sense the temperature of the header 10. The header 10 includes a plurality of nozzles 14 for example, 300 nozzles, and sprays ink through the nozzles to perform a print operation. When the ink is sprayed, the temperature of the header increases. In particular, in embodiments of the present invention, the ink is sprayed a predetermined number of times, and then the temperature of the thermistor is determined. When the ink is sprayed many times, for example, 200 times, through the whole nozzles, most thermistors reach the same temperature, and thus the voltage output of a particular thermistor can be compared.

Figures 4, 5:
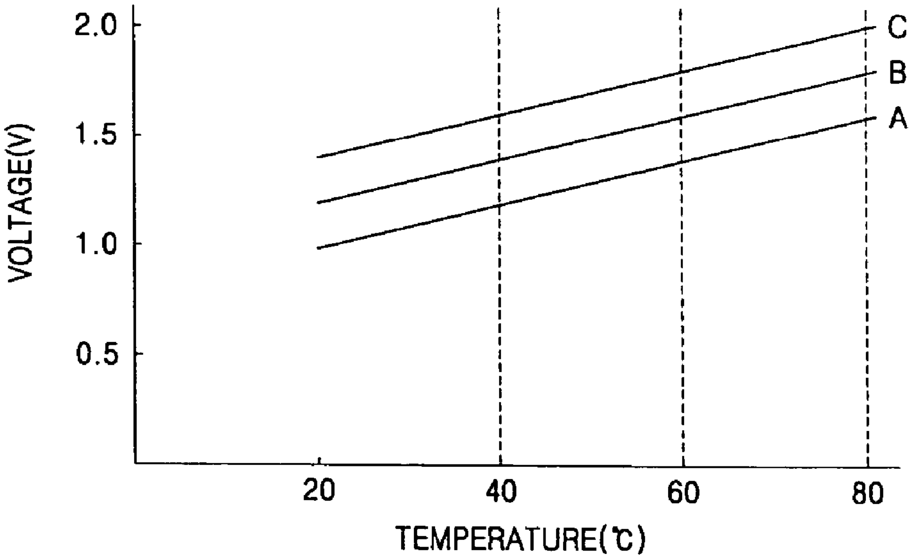
FIG. 4 is a table illustrating a temperature and an output voltage of the temperature sensor.
FIG. 5 is a graph illustrating the table shown in FIG. 4.

Therefore, in embodiments of the present invention, as shown in FIGS. 4 and 5, the temperature of the thermistor corresponds to the number of times the ink is sprayed. FIG. 4 is a table illustrating a temperature and an output voltage of the temperature sensor, and FIG. 5 is a graph illustrating the table shown in FIG. 4. As shown in FIGS. 4 and 5, although there is deviation of ±20% between thermistors, the temperature of the thermistor has almost the same value, when the ink is sprayed a sufficient number of times. For reference, in practice, spraying ink 200 times through the whole nozzles is referred to as 200 slice firing.

As shown in FIG. 1, the main unit 20 includes an amplifier 22, an analog to digital converter (ADC) 24, a controller 26, a nonvolatile memory 28 and a memory unit 30.

The amplifier 22 amplifies the output voltage from the thermistor to output an amplified output voltage to the ADC 24. Preferably, an operational amplifier is used as the amplifier 22. The ADC 24 converts the amplified output voltage into a digital signal to output a digitized output voltage to the controller 26.

The controller 26 measures the temperature of the thermistor based on the digitized output voltage. Meanwhile, in order to determine a correction value, the controller 26 uses the digitized output voltage and the temperature of the thermistor corresponding to the sprayed times of the ink. The controller 26 uses the following equation (1):

$$\text{Temperature}=\text{Slope}*\text{Output voltage}+\text{Correction value} \quad (1)$$

Herein the slope is 100. The slope is the ratio of a change in the temperature of the thermistor to a change in the output voltage of the thermistor. For example, in case of a temperature sensor "A", when the ink is sprayed 100 times, the output voltage is 1.2 V and the temperature is 40° C. When the ink is sprayed 200 times, the output voltage is 1.4 V and the temperature is 60° C. The temperature is increased by 20° C. while the output voltage is increased by 0.2 V. Thus, the slope is 100. As shown in FIG. 4, there is a characteristic that the temperature of the thermistor corresponding to the sprayed times of the ink has the same value in most thermistors. Embodiments of the present invention take advantage of this characteristic. As shown in FIG. 5, it can be shown that the slopes of three different temperature sensors are substantially identical. Referring to FIG. 5, the slope is the ratio of a change in the output voltage of the thermistor to a change in the temperature of the thermistor.

Since the nonvolatile memory 28 stores the correction value, the correction value can be used until a new thermistor is used. The deviation-corrected temperature of the temperature sensor can be determined based on the output voltage from the temperature sensor using the correction value. The controller 26 transmits a proper driving pulse signal 32 to the header 10 based on the deviation-corrected temperature.

The memory unit 30 stores the temperature of the thermistor, which is used to determine the correction value, corresponding to the number of times the ink is sprayed.

Figure 2:
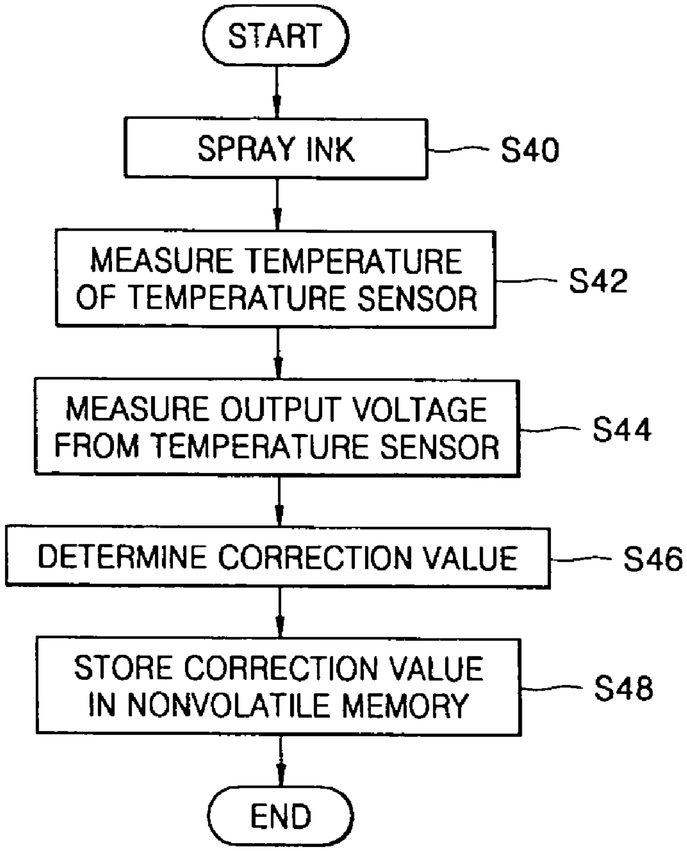
FIG. 2 is a flowchart of a temperature sensor deviation correcting method according to an embodiment of the present invention.
Figure 3:
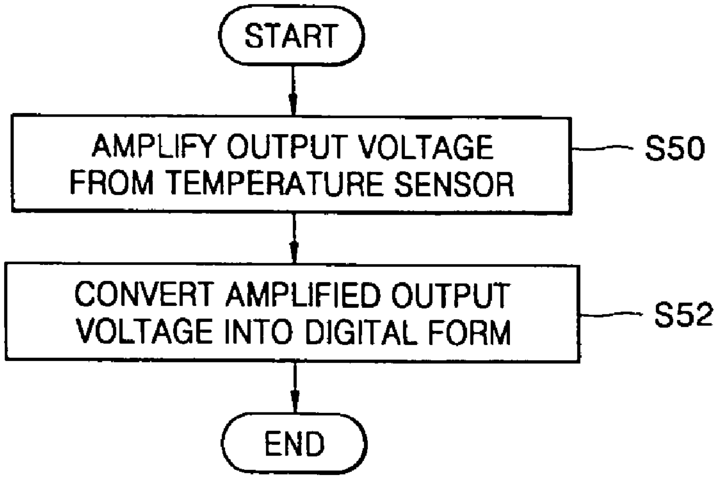
FIG. 3 is a flowchart of steps of measuring an output voltage of the temperature sensor according to an embodiment of the present invention.

Hereinafter, a deviation correcting method of a temperature sensor placed in a header having a plurality of nozzles in an inkjet printer will be described with reference to FIGS. 2 and 3. FIG. 2 is a flowchart of a temperature sensor deviation correcting method according to an embodiment of the present invention, and FIG. 3 is a flowchart of steps of measuring an output voltage of the temperature sensor.

Embodiments of the present invention include the step of determining a correction value of a thermistor as the temperature sensor. Since there is deviation of ±20% in the thermistor installed within the header, the following steps are performed to obtain the correction value of the thermistor when a new header is used or the correction value of the thermistor is not known.

Referring to FIG. 2, in step S40, ink is sprayed through the nozzles a predetermined number of times. Then, in step S42, the temperature of the temperature sensor corresponding to the sprayed times is determined. There is a characteristic that the temperature of the thermistor has almost the same value in most thermistors corresponding to the sprayed times of the ink. That is, regardless of the thermistor, the temperature of the thermistor has almost the same value when the ink is sprayed a sufficient number of times. Referring to FIG. 4, the temperature of the thermistor becomes 40, 60, and 80° C. when the ink are sprayed 100, 200, and 300 times, respectively.

Then, in step S44, a voltage output from the temperature sensor is measured. For example, as shown in FIG. 4, the output voltage from the temperature sensor "A" is 1.4 V after the ink is sprayed 200 times. As shown in FIG. 3, the step S44 of measuring the output voltage from the temperature sensor includes steps of amplifying the output voltage from the temperature sensor (S50) and converting the amplified output voltage into a digital form (S52).

Next, in step S46, a correction value of the temperature sensor is determined using the temperature and the output voltage of the temperature sensor. The correction value is determined using the above equation (1). For example, in the case of the temperature sensor "A", when the ink is sprayed 200 times through the whole nozzles, the temperature is 60° C., the output voltage is 1.4 V, and the slope is 100. As described above with reference to FIG. 5, most of the thermistors have the same slope. The above values are applied to the equation (1), as follows:

$$60=100*1.4+\text{correction value}$$

Thus, the correction value is −80. In step S48, the correction value is stored in a nonvolatile memory.

As described above, since the correction value of the temperature sensor installed in the header is determined, the deviation corrected temperature of the temperature sensor can be now determined based on the output voltage from the temperature sensor using the correction value. In the meantime, when a new header having a new thermistor is used, the above steps are performed again to obtain a new correction value.

As described above, this invention makes it possible to correct a large amount of deviation of a thermistor in a header without using an additional element, that is, an ambient sensor. Therefore, since an expensive ambient sensor is not used, costs can be reduced and a printer circuit configuration is simplified.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of correcting deviation of a temperature sensor placed in a header having a plurality of nozzles in an inkjet printer, the method comprising the steps of:

spraying ink through the nozzles a predetermined number of times;

determining a temperature of the temperature sensor corresponding to the number of sprayed times;

measuring a voltage output from the temperature sensor; and determining a correction value of the temperature sensor using the determined temperature and the output voltage of the temperature sensor.

2. The method of claim 1, further comprising storing the correction value in a nonvolatile memory.

3. The method of claim 1, wherein the temperature sensor comprises a thermistor.

4. The method of claim 1, wherein the correction value is determined according to the following equation:

Temperature=Slope*Output voltage+Correction value, in which the Slope is the ratio of a change in the determined temperature to a change in the output voltage, Temperature is the determined temperature, and Output voltage is the measured voltage.

5. The method of claim 4, wherein the Slope is 100 degrees C./voltage.

6. The method of claim 1, wherein the step of measuring the output voltage from the temperature sensor comprises:

amplifying the output voltage from the temperature sensor; and converting the analog amplified output voltage into a digital form.

7. The method of claim 1, further comprising determining deviation corrected temperature of the temperature sensor based on the output voltage of the temperature sensor using the determined correction value.

8. An apparatus for correcting deviation of a temperature sensor placed in a header having a plurality of nozzles in an inkjet printer, the apparatus comprising:

a header for spraying ink through the nozzles a predetermined number of times;

a memory unit for determining a temperature of the temperature sensor corresponding to the number of sprayed times;

a voltage measuring unit for measuring a voltage output from the temperature sensor; and a controller for determining a correction value of the temperature sensor using the determined temperature and the output voltage of the temperature sensor.

9. The apparatus of claim 8, further comprising a nonvolatile memory storing the correction value.

10. The apparatus of claim 8, wherein the temperature sensor comprises a thermistor.

11. The apparatus of claim 8, wherein the controller determines the correction value using the following equation:

Temperature=Slope*Output voltage+Correction value, in which the Slope is the ratio of a change in the determined temperature to a change in the output voltage, Temperature is the determined temperature, and Output voltage is the measured voltage.

12. The apparatus of claim 11, wherein the Slope is 100 degrees C./voltage.

13. The apparatus of claim 8, wherein the voltage measuring unit comprises:

an amplifier for amplifying the output voltage from the temperature sensor; and an analog to digital converter for converting the amplified output voltage into a digital form.

14. The apparatus of claim 13, wherein the amplifier comprises an operational amplifier.

* * * * *